(12) United States Patent
Nakata et al.

(10) Patent No.: US 10,279,287 B2
(45) Date of Patent: May 7, 2019

(54) EQUIPMENT FOR SOLID-LIQUID SEPARATION AND DRYING OF FINE-POWDER SLURRY, AND METHOD THERFOR

(71) Applicant: TSUKISHIMA KIKAI CO., LTD., Tokyo (JP)

(72) Inventors: Yoichi Nakata, Tokyo (JP); Tomonori Watarai, Tokyo (JP); Sumito Sato, Tokyo (JP); Satoshi Suwa, Tokyo (JP); Tomoki Homma, Tokyo (JP)

(73) Assignee: TSUKISHIMA KIKAI CO., LTD., Tokyo (JP)

( * ) Notice: Subject to any disclaimer, the term of this patent is extended or adjusted under 35 U.S.C. 154(b) by 389 days.

(21) Appl. No.: 15/110,538

(22) PCT Filed: Dec. 22, 2014

(86) PCT No.: PCT/JP2014/083952
§ 371 (c)(1),
(2) Date: Jul. 8, 2016

(87) PCT Pub. No.: WO2015/104990
PCT Pub. Date: Jul. 16, 2015

(65) Prior Publication Data
US 2016/0325209 A1 Nov. 10, 2016

(30) Foreign Application Priority Data

Jan. 10, 2014 (JP) .................................. 2014-002930
Jan. 10, 2014 (JP) .................................. 2014-002931

(51) Int. Cl.
*B01D 33/64* (2006.01)
*F26B 17/02* (2006.01)
(Continued)

(52) U.S. Cl.
CPC ......... *B01D 33/642* (2013.01); *B01D 33/666* (2013.01); *F26B 5/14* (2013.01);
(Continued)

(58) Field of Classification Search
None
See application file for complete search history.

(56) References Cited

U.S. PATENT DOCUMENTS 2,736,434 A * 2/1956 Yacoe ..................... C10B 53/02
210/178
4,031,354 A 6/1977 D'Souza
(Continued)

FOREIGN PATENT DOCUMENTS

CN 101925388 A 12/2010
EP 2657404 A2 10/2013
(Continued)

*Primary Examiner* — Robert J Popovics
(74) *Attorney, Agent, or Firm* — Muncy, Geissler, Olds & Lowe, P.C.

(57) ABSTRACT

Prevention of contamination of a dried product, deformation of particles, and a change of particle size distribution. The system includes: a solid-liquid separator in which a processing material is supplied between a pair of endless separation filter cloths wound around an outer periphery of a separation roll, and is dehydrated by being squeezed therebetween and also by ventilation gas passing from a ventilation port formed in an outer peripheral surface of the separation roll; and a horizontal rotary dryer provided on a subsequent stage of the solid-liquid separator, wherein carrier gas is made to flow in a rotating shell of the dryer in a cocurrent manner in the same direction as a conveyance direction of the processing material.

13 Claims, 12 Drawing Sheets

(51) Int. Cl.
- *B01D 33/66* (2006.01)
- *F26B 5/14* (2006.01)
- *F26B 17/32* (2006.01)
- *F26B 17/28* (2006.01)

(52) U.S. Cl.
CPC .............. *F26B 17/02* (2013.01); *F26B 17/28* (2013.01); *F26B 17/32* (2013.01)

(56) References Cited

U.S. PATENT DOCUMENTS

| | | | | |
|---|---|---|---|---|
| 4,523,988 A * | 6/1985 | Hedrick, II | ............... | B07B 9/00 209/11 |
| 5,091,079 A * | 2/1992 | Gayman | ................... | A62D 3/33 210/175 |
| 5,133,883 A * | 7/1992 | Prinssen | ................ | B01D 33/04 210/386 |
| 5,207,907 A * | 5/1993 | DeLons | ................. | B01D 29/01 100/118 |
| 5,221,472 A * | 6/1993 | Ikeda | ..................... | B01D 29/09 210/389 |
| 5,233,763 A * | 8/1993 | Minnie, Jr. | ............. | F26B 3/283 110/223 |
| 5,308,486 A * | 5/1994 | Heintze | .................. | B01D 25/38 210/396 |
| 5,366,626 A * | 11/1994 | Pierson | .................. | B01D 29/09 210/216 |
| 5,368,732 A * | 11/1994 | Pierson | .................. | B01D 29/09 210/386 |
| 5,520,824 A * | 5/1996 | Sasaki | .................... | B01D 33/04 210/780 |
| 5,527,458 A * | 6/1996 | Gehrmann | ............. | B01D 33/04 210/177 |
| 5,571,404 A * | 11/1996 | Derenthal | ............... | B01D 33/04 210/97 |
| 5,643,468 A * | 7/1997 | Ure | ........................ | B01D 33/04 210/771 |
| 5,840,187 A * | 11/1998 | Derenthal | ............... | F26B 3/283 210/400 |
| 5,985,159 A * | 11/1999 | Strid | ......................... | D21F 1/66 100/116 |
| 6,221,265 B1 * | 4/2001 | Hoden | .................... | B30B 9/245 100/118 |
| 6,248,245 B1 * | 6/2001 | Thompson | ........... | B01D 33/042 210/783 |
| 6,454,102 B2 * | 9/2002 | Thompson | ........... | B01D 33/042 210/386 |
| 6,555,013 B2 * | 4/2003 | Nakamura | ............. | B01D 33/04 210/769 |
| 6,622,870 B1 * | 9/2003 | Prinssen | .............. | B01D 33/747 210/398 |
| 7,028,414 B2 * | 4/2006 | Vonplon | .................... | F26B 1/00 34/236 |
| 7,314,141 B1 * | 1/2008 | Day | ..................... | B01D 33/042 210/400 |
| 7,381,329 B1 * | 6/2008 | Moss | ..................... | B01D 33/04 210/255 |
| 7,651,619 B2 * | 1/2010 | Hansen | .................. | B01D 9/005 210/223 |
| 7,964,105 B2 * | 6/2011 | Moss | .................. | B01D 33/042 210/770 |
| 8,286,801 B2 * | 10/2012 | Youngs | .................. | B01D 33/04 210/400 |
| 8,562,832 B2 * | 10/2013 | Houle | ................ | B01D 33/0361 209/17 |
| 9,863,101 B2 * | 1/2018 | Mollick | .................. | E01C 19/10 |
| 10,072,214 B1 * | 9/2018 | Green | ...................... | C10F 5/06 |
| 2011/0041393 A1 | 2/2011 | Sugita et al. | | |
| 2015/0209829 A1 * | 7/2015 | De Siqueira | ........... | B02C 23/08 241/19 |
| 2016/0325209 A1 * | 11/2016 | Nakata | ...................... | F26B 5/14 |
| 2016/0355998 A1 * | 12/2016 | Mollick | .................. | E01C 19/10 |
| 2018/0135256 A1 * | 5/2018 | Schwartz Franceschini | ............... | E01C 19/10 |

FOREIGN PATENT DOCUMENTS

| | | |
|---|---|---|
| JP | 61-138081 A | 6/1986 |
| JP | 6-58665 A | 3/1994 |
| JP | 7-243626 A | 9/1995 |
| JP | 2000-320966 A | 11/2000 |
| JP | 2000-346557 A | 12/2000 |
| JP | 2004-44876 A | 2/2004 |
| JP | 2004-197989 A | 7/2004 |
| JP | 2007-112880 A | 5/2007 |
| JP | 2009-97783 A | 5/2009 |
| JP | 4381461 B2 | 12/2009 |
| JP | 4381462 B1 | 12/2009 |
| JP | 2010-104892 A | 5/2010 |
| JP | 2010-149012 A | 7/2010 |
| JP | 2010149010 A | 7/2010 |
| JP | 4677484 B2 | 4/2011 |
| JP | 2011078933 A | 4/2011 |
| JP | 4739401 B2 | 8/2011 |
| JP | 2012-83031 A | 4/2012 |
| JP | 5136904 B2 | 2/2013 |
| JP | 2013151383 A | 8/2013 |
| TW | 200946202 A | 11/2009 |
| WO | WO99/60317 | 11/1999 |
| WO | WO 2010/150343 A1 | 5/2007 |
| WO | WO2010084984 A1 | 7/2010 |
| WO | WO 2013019086 A2 | 2/2013 |
| WO | WO 2013111487 A1 | 8/2013 |

\* cited by examiner

EQUIPMENT FOR SOLID-LIQUID SEPARATION AND DRYING OF FINE-POWDER SLURRY, AND METHOD THERFOR

TECHNICAL FIELD

The present invention relates to system for solid-liquid separation and drying of fine-powder slurry. In particular, it relates to system for slurry solid-liquid separation and drying whose abrasion due to metal fine powder can be suppressed when the system filters and dries slurry containing the metal fine powder, and to a method therefor.

BACKGROUND ART

In manufacturing processes of metal oxide and metal hydroxide which are used as battery materials and the like, a common way to finally produce them as metal fine powder is to filter slurry containing the metal fine powder and thereafter dry the slurry by a flash dryer or a spray dryer to thereby obtain a dried product of the intended metal oxide or metal hydroxide.

More specifically, in the case where the flash dryer is used for the drying, aggregated wet powder obtained from the filtering process is conveyed in a tube of a dryer by hot air and during the conveyance process, is dried by convection heat transfer by the hot air, whereby the dried product of the metal fine powder is obtained.

In the case where the spray dryer is used for the drying, the slurry is sprayed and dispersed into a drying chamber through a disperser such as a rotary atomizer or a nozzle. Hot air is blown into the drying chamber, and sprayed droplets are dried while settling down in the hot air due to gravity, whereby the dried product of the metal fine powder is obtained.

The following documents can be cited as inventions to obtain metal oxide, metal hydroxide, and so on by using such a flash dryer, spray dryer, or the like.

PRIOR ART DOCUMENT

Patent Document

Patent Document 1: Japanese Patent Publication No. 5136904
Patent Document 2: Japanese Unexamined Patent Application Publication No. 2011-078933

SUMMARY OF THE INVENTION

Problems to be Solved by the Invention

The aforesaid spray dryer, however, has a problem that it is poorer in thermal efficiency than other drying methods such as fluidized drying and indirect heating drying.

If a water content of the slurry is reduced in order to increase the thermal efficiency, the metal fine powder contained in the slurry comes into contact with the disperser such as the rotary atomizer or the nozzle at a high speed. This as a result causes a problem that the disperser suffers abrasion and the disperser is scraped to be metal fine powder and is mixed in the slurry (contamination).

Further, fine particles with a 100 μm particle size or less, when in a wet state, generally have strong adherence and exhibit a viscosity since, regardless of their material, liquid existing on interfaces of the particles is formed liquid bridge. Thus, they are likely to adhere to an inner wall of a processing apparatus and are difficult to handle. In particular, thixotropy and dilatancy phenomena sometimes appear. Even if these phenomena do not occur, it is an actual situation that they are difficult to handle only because they have a high viscosity.

Various factors influence the handling of the aforesaid fine particles, such as whether they are metal powder or not, whether they are inorganic powder or organic powder, their solubility to polar liquid, their composition, and so on. Generally, however, since adherence of particles depends on particle size, that is, the surface area of the particles (area of influence of their interfaces), wet powder of fine particles is generally difficult to handle if their particle size is 100 μm or less.

When slurry containing such fine particles is dehydrated, the aforesaid problem of thixotropy or the like occurs and its adhesive property increases. Generally, when slurry whose liquid content (water content) is 90 wt % (wet basis (hereinafter, referred to as W.B.)) or more is reduced the liquid content to 20 to 30 wt % (W.B.) by solid-liquid separation, its adherence often becomes high due to the thixotropy, though differing depending on the kind or the like of the fine particles.

Because of this, when the liquid content (water content) is reduced to about 20 to 30 wt % (W.B.) in a dehydrating process and the highly adhesive slurry obtained after the solid-liquid separation is conveyed to a dryer, a device for mechanical forcible conveyance such as a screw conveyor is necessary.

When a forcible conveying means such as the screw conveyor is used, however, the conveyed slurry having undergone the filtration (processing material) is given a large shearing force between an inner wall and a screw of the screw conveyor. Because of this, friction generated during the conveyance scrapes off, for example, metal forming the screw, and this metal is mixed (contamination) in a final product, which has caused a problem of a difficulty in obtaining a high-quality product.

Another problem is that the shearing force of the screw causes the deformation of the metal particles in the slurry or a change of particle size distribution. Consequently, these events lead to quality deterioration and yield reduction of the final product.

Therefore, it is an object of the present invention to prevent the contamination in a dried product, the deformation of particles, and the change of particle size distribution, to thereby prevent the quality and yield deterioration of a final product.

Means for Solving the Problems

The present invention that has solved the above-described problems relates to system for solid-liquid separation and drying of fine-powder slurry, the system including:

a solid-liquid separator including a structure in which a pair of endless separation filter cloths is wound in a stacked state around an outer periphery of a separation roll rotated in a circumferential direction and is capable of running along the rotation direction of the separation roll, and in which a processing material supplied between the pair of separation filter cloths is deliquored by being sandwiched and squeezed between the pair of separation filter cloths on an outer peripheral surface of the separation roll and also by ventilation gas passing from an inside toward an outside of the separation roll through a ventilation port formed in the outer peripheral surface of the separation roll; and a horizontal rotary dryer which is installed on a subsequent stage of the solid-liquid separator, has a feed port of the processing material at one end side and a discharge port of the processing material at another end side, includes: a rotating shell rotatable around an axial direction; and a heating unit provided inside the rotating shell and having heating tubes having a heating medium flow therethrough, and heats and dries the processing material by the heating unit in a process where the processing material supplied from the feed port of the rotating shell is discharged from the discharge port, wherein carrier gas is made to flow in the rotating shell in a cocurrent manner in the same direction as a conveyance direction of the processing material.

When slurry with an about 90 wt % (wet basis W.B.) liquid content containing fine powder (in particular, fine particles with a 100 μm particle size or less) is deliquored (dehydrated) by a conventional solid-liquid separator, about 35 to 30 wt % (W.B.) is the lowest achievable liquid content of the slurry having undergone the solid-liquid separation.

As a result, under the present situation, the aforesaid various problems are occurring due to the relatively high liquid content.

On the other hand, the solid-liquid separator with the above-described structure according to the present invention, in particular, representatively according to the solid-liquid separators described in Japanese Patent Publication No. 4677484, Japanese Patent Publication No. 4739401, Japanese Patent Publication No. 4381461, Japanese Patent Publication No. 4381462, and the like, it is possible to reduce a liquid content of slurry having undergone the dehydration to about 19 to 12 wt % (W.B.).

When the liquid content is to such a degree (19 to 12 wt % (W.B.)), it is possible to prevent the thixotropy phenomenon and the dilatancy phenomenon.

Moreover, according to the horizontal rotary dryer (indirect heating-type horizontal rotary dryer) of the present invention, the fine particles only roll under what is called a kiln action, and no mechanical forcible mixing force acts as an external force, and thus no damage occurs in the fine particles and it is possible to obtain a high-quality dried product, which is very preferable.

In the present invention, the carrier gas is made to flow in the rotating shell in the cocurrent manner in the same direction as the conveyance direction of the processing material. The carrier gas is used mainly for discharging vapor which has evaporated from the processing material in a drying process, to the outside of the rotating shell.

Conventionally, there has been adopted countercurrent flow that makes the carrier gas flow in an opposite direction to a direction in which a processing material moves. When this countercurrent flow is adopted, the vicinity of an outlet-side end portion of the rotating shell which is an outlet side of the processing material is a place from which the carrier gas flows in, and thus has a low humidity since an amount of the vapor evaporating from the processing material is small there. This has a merit that it is possible to prevent the processing material from absorbing moisture and reduce moisture of the processing material.

In the vicinity of an inlet-side end portion of the rotating shell, however, a large amount of the vapor contained in the carrier gas makes high humidity in the atmosphere. When the processing material comes into contact with the countercurrent carrier gas at the inlet-side end portion of the rotating shell having such a high humidity atmosphere, dew condensation of the vapor occurs due to condensation heat transfer since the temperature of the processing material is lower than the temperature of the carrier gas. The dew condensation of the vapor becomes adhesive moisture adhering to a surface of the processing material to increase a moisture content of the processing material. This as a result causes problems that the processing material adheres to the inside of the rotating shell, clogs a passage in the rotating shell, and granulates.

Since the processing material is heated and its moisture gradually evaporates in the rotary dryer, the processing material comes to have a high temperature and gets into a highly active state in the vicinity of the outlet-side end portion of the rotating shell. When the low-humidity carrier gas then flows in here, there sometimes occurs a problem that the processing material reacts with oxygen and carbon dioxide gas in the carrier gas to undergo quality deterioration as it comes into contact with the carrier gas.

To avoid such problems, the present invention adopts the cocurrent flow that makes the carrier gas flow in the same direction as the conveyance direction of the processing material. Since the carrier gas flows in from the inlet-side end portion of the rotating shell, the humidity in the vicinity of the inlet-side end portion of the rotating shell becomes low. This as a result has a merit that the dew condensation is not likely to occur even when the temperature of the supplied processing material is low. Since the dew condensation does not occur, the processing material does not clog the passage of the processing material by adhering to the inside of the rotating shell, nor does the processing material granulate.

Meanwhile, the moisture evaporated from the processing material in the drying process accompanies the carrier gas to be carried to the outlet-side end portion of the rotating shell, so that a ratio of the vapor occupying the composition of the gas in the vicinity of the outlet-side end portion of the rotating shell becomes high. This can reduce the concentration of the oxygen and carbon dioxide gas to suppress the reaction of the processing material with the oxygen and carbon dioxide gas in the gas. As a result, it is possible to avoid the quality deterioration and yield reduction of the final product.

(Mechanical Conveying Means: Belt Conveyor)

A belt conveyor can be provided between a drop chute connected to a discharge port of the solid-liquid separator and a feed chute connected to the feed port of the horizontal rotary dryer. This belt conveyor receives a deliquored material dropping from the drop chute, conveys the deliquored material, and leads the deliquored material from its terminal end to the feed chute. Incidentally, the solid-liquid separator and the belt conveyor may be directly connected to each other without the drop chute therebetween.

Providing the belt conveyor instead of a screw conveyor for conveying the deliquored material from the solid-liquid separator to the dryer prevents a shearing stress from being applied to the deliquored material. Consequently, metal of the screw or the like is not abraded and does not mix as impurities in the final product. The deformation of particles of the final product and the change of the particle size distribution do not occur either.

A material of a belt forming the belt conveyor is preferably rubber. It may also be a resin belt.

Another possible structure is that a damper which opens/closes a flow path of the feed chute is provided in the middle of the feed chute and the carrier gas is made to flow in from a more downstream side (side closer to the horizontal rotary dryer) than the damper.

Providing the damper makes it possible for the deliquored material to flow in smoothly via the feed chute. It is also possible to hinder the hot air from the inside of the rotating shell from giving influence on the belt conveyor side. As a great merit, it is also possible to use the carrier gas as cleaning gas of the feed chute.

Incidentally, a position where to provide the damper may be either an upper end or a lower end of the feed chute. Alternatively, the discharge port of the belt conveyor and the feed port of the horizontal rotary dryer can be directly connected without the feed chute being provided. Further, in this case, the damper can be provided at a joint portion between the belt conveyor and the dryer.

(Downflow Path)

According to another mode of the present invention, the system may include a downflow path which leads the processing material discharged from the solid-liquid separator of the fine-powder slurry to the feed port of the horizontal rotary dryer by gravity of fall without using a mechanical conveying means.

If the processing material discharged from the solid-liquid separator is led to the feed port of the horizontal rotary dryer through the downflow path by the gravity of fall without using the mechanical conveying means, the aforesaid impurities do not mix in the final product. Nor do the deformation of the particles of the final product and the change of the particle size distribution occur.

By leading the deliquored material directly into the horizontal rotary dryer without using the mechanical conveying means, it is also possible to transfer it in a relatively shorter time than when the mechanical conveying means is used. This can suppress a temperature decrease of the deliquored material, which makes it possible to reduce a drying load in the dryer and eliminate a quality deteriorating factor ascribable to the temperature decrease.

The downflow path desirably leads the processing material to the feed port of the horizontal rotary dryer only by the gravity of fall.

An airlock device which blocks and permits the communication between the inside of a hood wrapping the solid-liquid separator and the inside of the horizontal rotary dryer is desirably provided in the downflow path.

If gas accompanied by a large amount of steam in the hood wrapping the solid-liquid separator is sent into the horizontal rotary dryer, the processing material sometimes adheres to the inlet portion of the horizontal rotary dryer and consequently is not dried sufficiently. Moreover, the relative humidity of the carrier gas increases, which will be a cause to lower thermal efficiency in the dryer.

On the other hand, at least a two-stage damper or one rotary valve can achieve the airlocking to solve the above problem. Further, the damper or the rotary valve only receives the processing material and releases the received material to allow it to fall due to gravity, and is not a mechanical conveying means in a horizontal direction like a screw conveyor and a belt conveyor, and accordingly abrasion and a shearing force accompanying the use of these do not occur. Accordingly, the mixture of the impurities in the final product, the deformation of the particles of the final product, and the change of the particle size distribution do not occur.

(Cleaning Device)

The solid-liquid separator is generally covered with a hood, and the discharge port of the processing material is formed in the hood. It is also preferable that the not yet squeezed processing material on one of the endless separation filter cloths is cleaned by a cleaning liquid. In this case, if the temperature of the cleaning liquid is a high temperature of, for example, 60 to 75° C., the gas in the hood is accompanied by a large amount of steam, but if the temperature of the cleaning liquid is 10 to 50° C., the adhesion of the processing material at the inlet portion of the horizontal rotary dryer and an excessive increase of the relative humidity of the carrier gas can be avoided, and the aforesaid problems do not noticeably occur.

(Bag Filter)

The carrier gas discharged from the horizontal rotary dryer (hereinafter, referred to as "exhaust gas") sometimes contains fine particles (dried product) of metal or the like. So, by further providing a bag filter on a subsequent stage of the dryer, it is possible to collect and recover the fine particles in the exhaust gas discharged from the dryer. It is also possible to release clean gas into the atmosphere since the fine particles are removed in a filter chamber.

(Exhaust Hood, Steam Pipe)

On the horizontal rotary dryer, an exhaust hood which covers the entire outlet-side end portion of the rotating shell, discharges the exhaust gas of the rotating shell, and is connected to the bag filter can be provided, and a steam pipe can be laid on the exhaust hood for the purpose of heat retention.

In the present invention, since the carrier gas is made to flow in the rotating shell in the cocurrent manner in the same direction as the conveyance direction of the processing material, the temperature of the dried product at the outlet side is low.

Here, laying the steam pipe on the exhaust hood for the purpose of heat retention enables the smooth discharge of steam.

The present invention can remarkably improve the conventional problems especially in a case where the processing material contains metal fine particles with a 100 μm particle size or less. In the present invention, however, the processing material may be inorganic powder, organic powder, high-molecular powder, or the like besides metal powder.

In the present invention, a liquid content of the slurry after it is dehydrated is most suitably 19 to 12 wt % (W.B.), as described above.

Effect of the Invention

The present invention can prevent the contamination in the dried product, the deformation of the particles, and the change of the particle size distribution. As a result, it is possible to prevent the deterioration of quality and yield of the final product.

MODES FOR CARRYING OUT THE INVENTION

Figure 1:
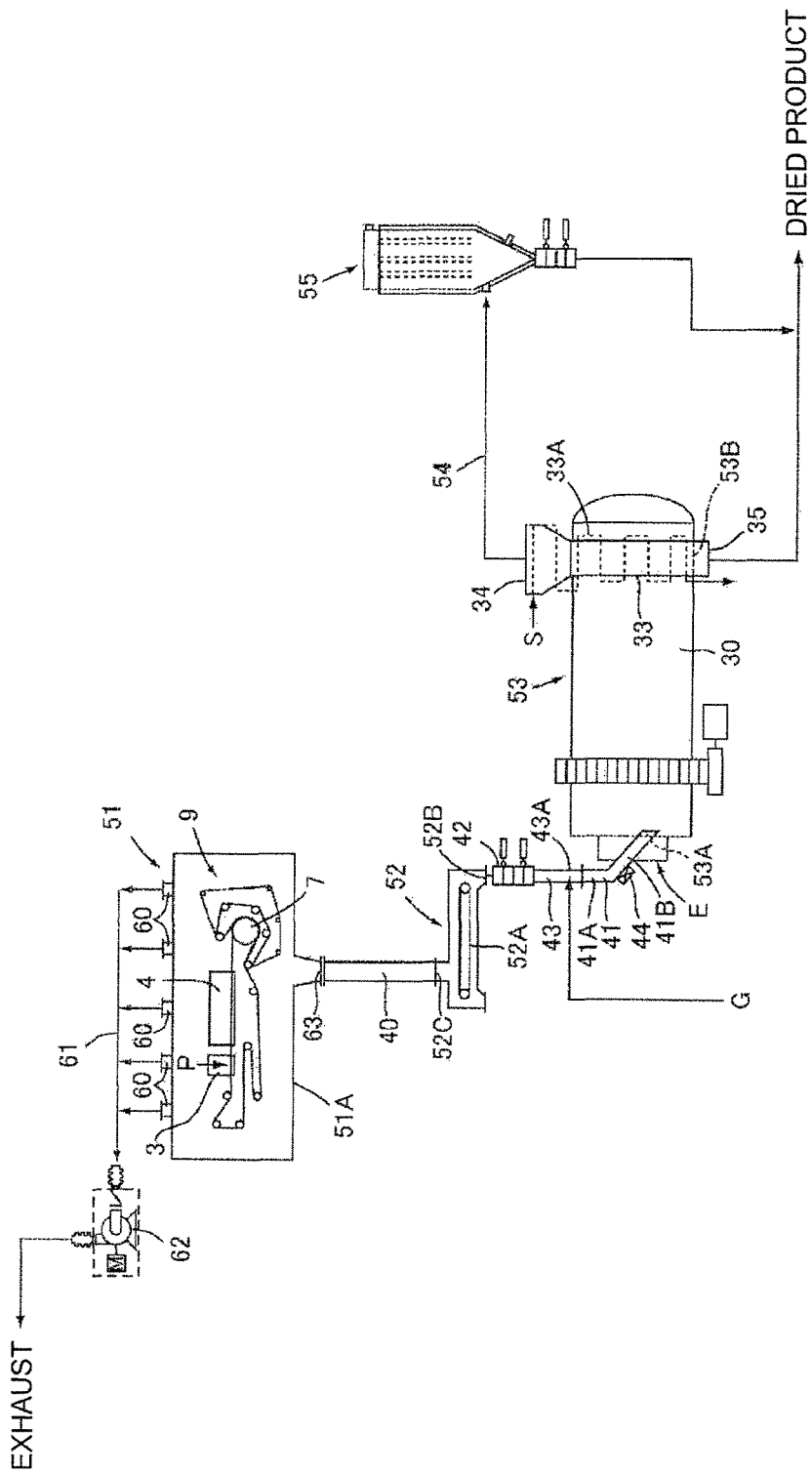
FIG. 1 is an overall view of system for solid-liquid separation and drying according to the present invention.

FIG. 1 is an overall view of system for solid-liquid separation and drying according to the present invention. This system for solid-liquid separation and drying is supplied with fine-powder slurry, which is subject to solid-liquid separation and drying to obtain a final product. Hereinafter, details of these will be fully described.

(Processing Material P)

A case where a processing material P is metal fine-powder slurry can be an example of an embodiment. Especially when this metal fine-powder slurry is slurry of metal fine particles with a 100 μm particle size or less, the effects of the present invention noticeably appear. Examples of the fine particles include metal fine powders of a transition metal compound, lithium salt powder, metal refining dust, silver powder, and so on. In more detail, examples of the transition metal compound include lithium titanate, iron oxide, ferric phosphate, nickel hydroxide, a nickel-manganese-cobalt compound, and so on. Examples of the metal refining dust include iron, zinc, copper, and so on. The slurry may be one using water as a dispersion medium, or another liquid may be its dispersion medium. It should be noted that, in the present invention, the slurry may be that of inorganic powder, organic powder, high-molecular powder, or the like besides the metal fine powder.

(Particle Size)

"Particle size" in the present invention refers to a median diameter. The median diameter is determined by using the following method, for instance. To be specific, particle size distribution is measured by the method described in JIS 8825 2013 by using a laser diffraction particle size analyzer (for example, brand name SALD-3100 manufactured by Shimadzu Corporation), and particle size when an accumulated volume corresponds to 50% is determined as the median diameter ($D_{50}$).

Note that the particle size of the fine particles contained in the aforesaid processing material P is preferably in a range of 100 μm to 0.01 μm.

(Solid-Liquid Separator 51)

A solid-liquid separator 51 according to the present invention has: a separation filter cloth 1 (hereinafter, referred to as a "filter cloth 1") which is wound around and runs along a plurality of rolls 2; a horizontal vacuum filtering device 4 which filters the processing material P supplied from a feed port 3 to the filter cloth 1; and a solid-liquid separator 9 provided on a subsequent stage of the horizontal vacuum filtering device 4 and used as a secondary dehydration mechanism. As the example, the device of Japanese Patent No. 4677484 can be listed. A structure example will be readily described below within a necessary range.

When the filter cloth 1 having the processing material P placed thereon runs on a vacuum tray, the horizontal vacuum filtering device 4 performs vacuum suction via this filter cloth 1 to thereby filter the processing material P.

Figure 2:
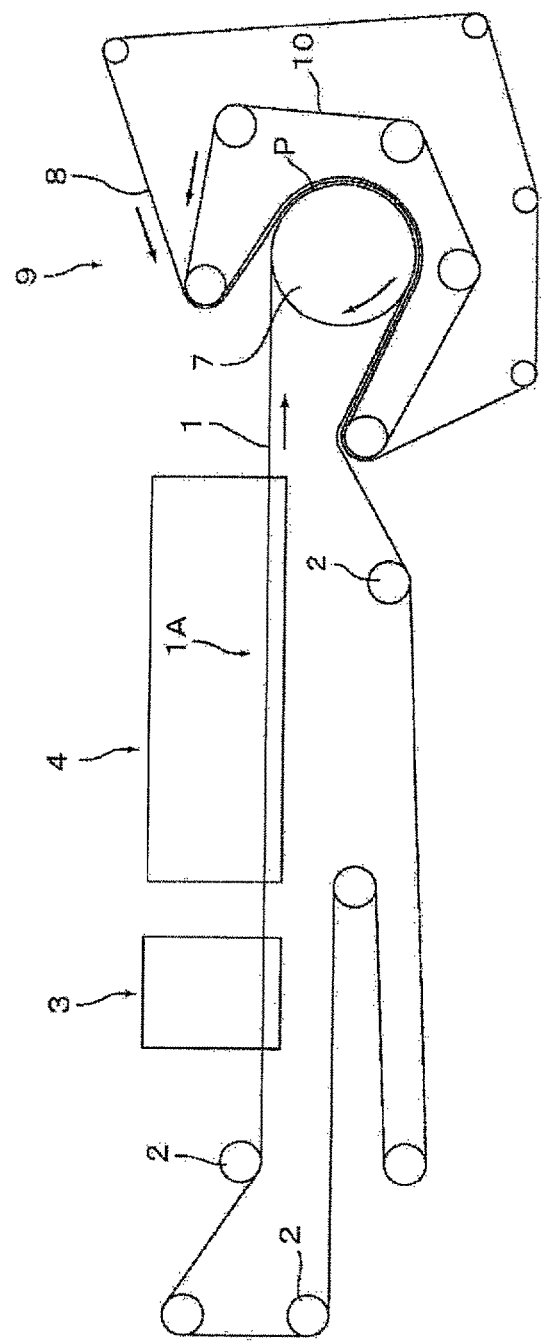
FIG. 2 is a schematic side view of a solid-liquid separator according to the present invention.
Figure 3:
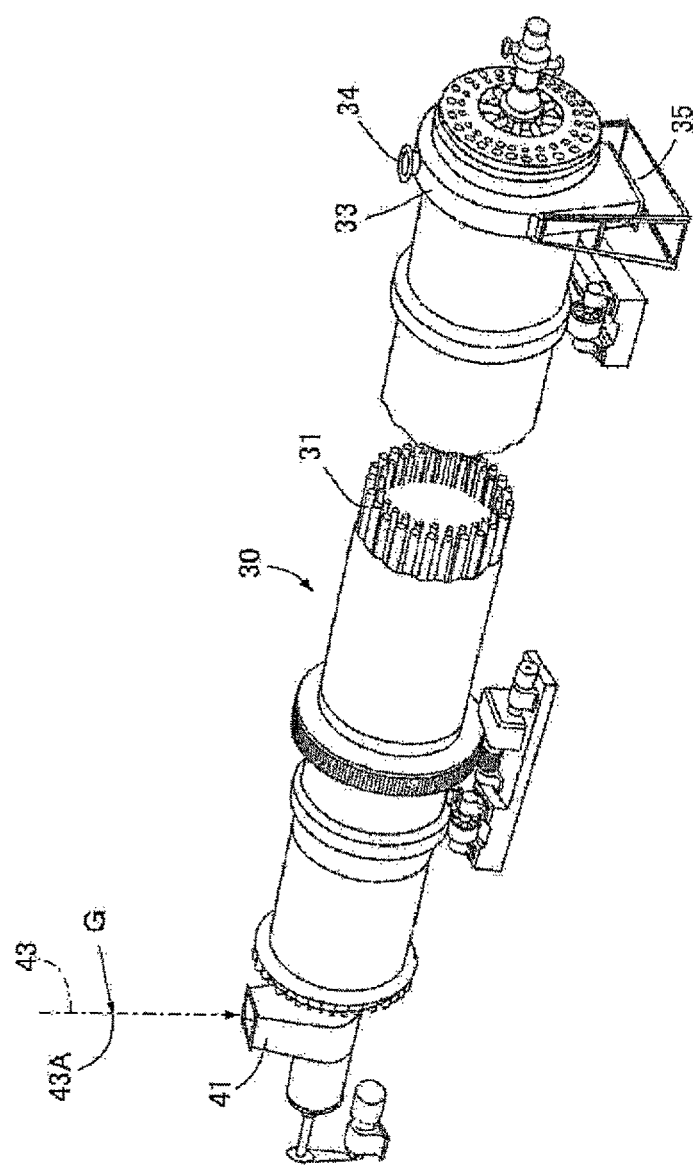
FIG. 3 is a schematic perspective view of a drying device according to the present invention.
Figure 4:
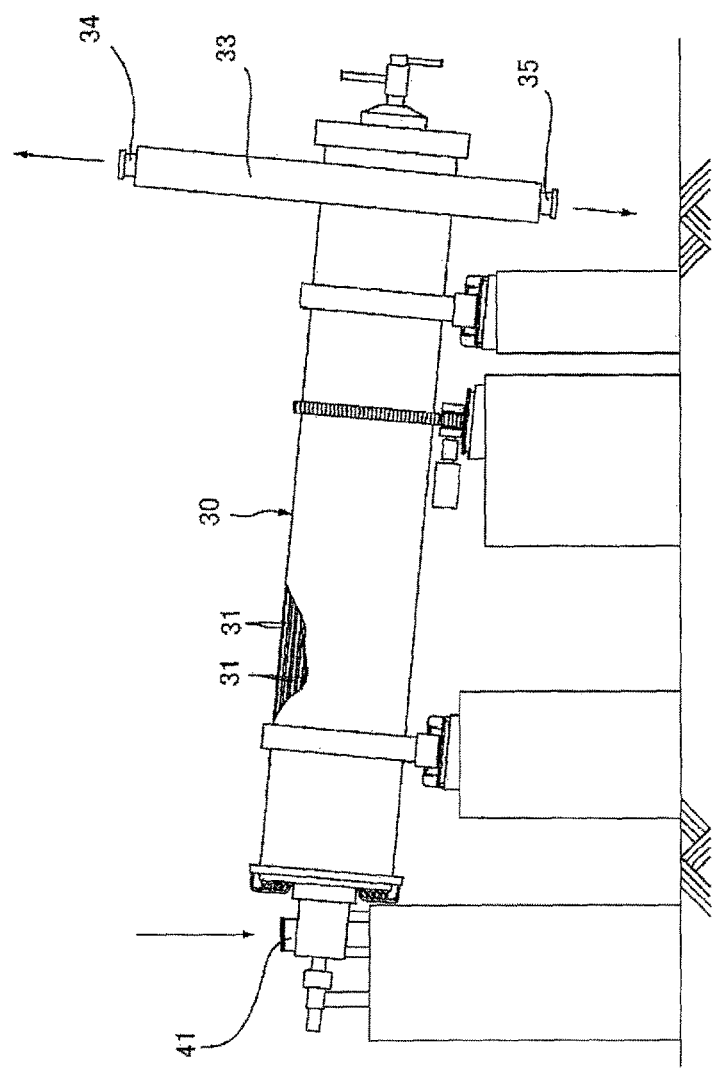
FIG. 4 is a side view of the drying device according to the present invention.

Further, the horizontal vacuum filtering device 4 is structured to make a cleaning liquid flow down from above the processing material P (deliquored cake) on the filter cloth 1 and clean the dehydrated cake by dissolving, in the cleaning liquid, impurities contained in the processing material P to increase product purity, as disclosed in, for example, Japanese Patent Publication No. 4677484, Japanese Patent Publication No. 4739401, Japanese Patent Publication No. 4381461, and Japanese Patent Publication No. 4381462, but being a widely used one, this structure is not illustrated in detail in FIG. 2.

As the cleaning liquid, an acid liquid or the like other than water is selectively used according to the kind of the processing material.

The temperature of the cleaning liquid is desirably 10 to 50° C. Alternatively, the cleaning liquid may have a high temperature of 60 to 75°.

When the temperature of the cleaning liquid is high, a hood 51 desirably surrounds the horizontal vacuum filtering device 4 to prevent steam from flowing out, for the purpose of improving thermal efficiency.

Incidentally, only with this horizontal vacuum filtering device 4, it is not possible to make a differential pressure that is larger than an atmospheric pressure act on the processing material. This sometimes makes it impossible for a liquid content of the dehydrated cake obtained after the filtering to reach a material value.

So, the solid-liquid separator 51 includes the solid-liquid separator 9 on the subsequent stage of the horizontal vacuum filtering device 4. This solid-liquid separator 9 performs secondary deliquoring (dehydration) to lower the liquid content of the dehydrated cake obtained after the filtering.

Figure 9:
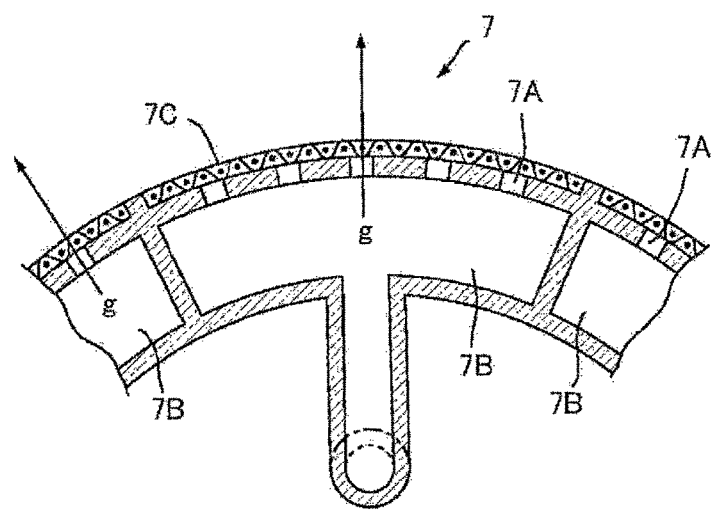
FIG. 9 is a partial sectional view of a separation roll of the solid-liquid separator.

The solid-liquid separator 9 includes a separation roll 7 and a separation filter cloth 8. The separation roll 7 is provided on a side of rolls more downstream in terms of a running direction than the horizontal vacuum filtering device 4, out of the plural rolls 2 located on an inner side of the filter cloth 1 supplied with the processing material P. In an outer peripheral surface of the separation roll 7, ventilation ports 7A are formed as illustrated in FIG. 9, and through the ventilation ports 7A, 7A, . . . , ventilation gas g is passed from the inside to the outside of the separation roll 7. This ventilation gas g passes through the filter cloth 1 to carry out solid-liquid separation for the processing material P on the filter cloth 1.

In an inner peripheral portion of the separation roll 7, a plurality of ventilation gas chambers 7B from which the ventilation gas g passes through the ventilation ports 7A of the separation roll 7 are formed so as to be insulated from one another at substantially equal intervals in a circumferential direction. In addition, in the outer peripheral surface of the separation roll 7, dented portions are formed in ranges where the respective ventilation gas chambers 7B are formed. Further, the ventilation ports 7A are open in bottom surfaces of the dented portions.

Further, desirably, the ventilation gas g is dispersed between the outer peripheral surface of the separation roll 7 and the filter cloth 1 by dispersing unit 7C which are housed in the dented portions of the outer peripheral surface of the separation roll 7 while being insulated from one another so as to correspond to the respective plural ventilation gas chambers 7B and are thereby sandwiched between the outer peripheral surface of the separation roll 7 and the filter cloth 1, and the ventilation gas g ventilates the processing material P to carry out solid-liquid separation for the processing material P. Examples of the dispersing unit 7C include a wire mesh, a resin mesh, a filter cloth coarser in mesh than the filter cloth 1, a sintered wire mesh, and so on. Preferably, the dispersing unit 7C are each disposed in a range equal to the width of the processing material P on the outer peripheral surface of the separation roll 7 or in a range narrower than this width, in terms of a center axis direction of the separation roll 7.

As described above, the filter cloth 1 is wound around the outer periphery of the separation roll 7, and as the filter cloth 1 moves, the processing material P is supplied between the filter cloth 1 and the separation filter cloth 8 on the separation roll 7. Thus sandwiching and squeezing the processing material P between the filter cloth 1 and the separation filter cloth 8 on the outer peripheral surface of the separation roll 7 enables further deliquoring. In order to increase a squeezing force at this time, a squeezing belt 10 is provided on a rear surface of the separation filter cloth 8, and the separation filter cloth 8 is pressed against the processing material P from the rear surface side. As the squeezing belt 10, one made of an appropriate material such as metal, resin, rubber, or cloth is usable, but the squeezing belt 10 desirably has air permeability so as to allow the gas from the ventilation gas chambers 7B to pass therethrough.

When being pressed against the outer periphery of the rotating separation roll 7 in this manner, the processing material P receives not only a pressing force in a radial direction of the separation roll 7 but also a shearing force in a circumferential direction due to a difference in running distance between the filter cloth 1 and the separation filter cloth 8 which sandwich the processing material P, that is, due to a difference in circumferential speed therebetween, so that it is efficiently squeezed.

The processing material P which is thus squeezed is further ventilated in the radial direction of the separation roll 7, so that its liquid component is separated through the separation filter cloth 8. As a result, it is possible to promote the effective removal of the liquid component even from the processing material P whose liquid content has been difficult to decrease sufficiently only with a surface pressure, a linear pressure, and pressurization in a direction perpendicular to the filter cloth 1.

Further, if the processing material P is only squeezed and ventilated while the filter cloth 1 and the separation filter cloth 8 which sandwich the processing material P are directly in close contact with the outer peripheral surface of the separation roll 7 in which the ventilation ports 7A are formed, an amount of the ventilation gas g passing to the processing material P becomes smaller at portions located between the ventilation ports 7A of the outer peripheral surface of the separation roll 7 than at portions wound around the separation roll 7 while being located at the ventilation ports 7A, so that a reduction of the liquid content becomes insufficient and also there is a possibility that the liquid content in the whole cake of the processing material P partially varies.

So, in the solid-liquid separator 9 according to the present invention, the dispersing unit 7C of the ventilation gas g are interposed between the outer peripheral surface of the separation roll 7 and the filter cloth 1, and the ventilation gas g spurting from the ventilation ports 7A of the outer peripheral surface of the separation roll 7 is dispersed between the outer peripheral surface and the filter cloth 1, whereby the ventilation gas g is uniformly passed to the processing material P sandwiched between the filter cloth 1 and the separation filter cloth 8. As a result, the liquid content in the whole cake becomes uniform and the reduction of the liquid content itself is promoted. Incidentally, as another mode, many fine ventilation ports can be formed in the outer peripheral surface of the separation roll 7.

The processing material deliquored (dehydrated) in the solid-liquid separator 9 is conveyed to a position where the filter cloth 1 and the separation filter cloth 8 are released from the close contact state, and is discharged from the solid-liquid separator 51 when the filter cloth 1 and the separation filter cloth 8 move in different directions to be released.

Figure 10:
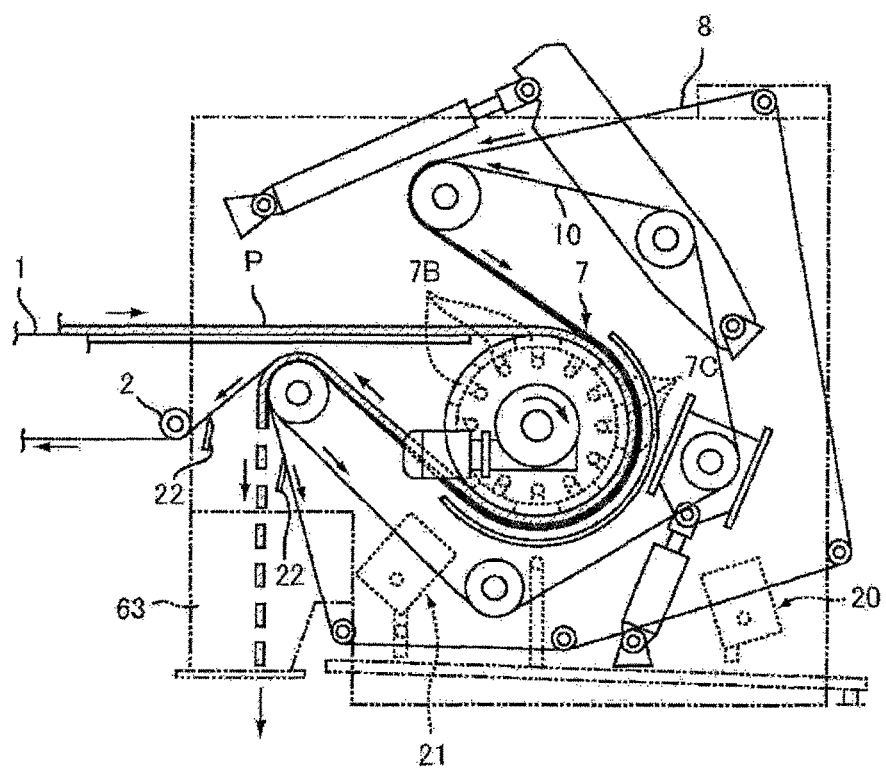
FIG. 10 is a side view of the solid-liquid separator.

Further, in running paths of the released filter cloth 1, separation filter cloth 8, and squeezing belt 10, a not-illustrated cleaning device of the filter cloth 1, and a separation filter cloth cleaning device 20 and a squeezing belt cleaning device 21 which are illustrated in FIG. 10 are provided in order to remove the processing material adhering (remaining) on surfaces of the filter cloth 1, the separation filter cloth 8, and the squeezing belt 10, and a cleaning liquid is sprayed toward the filter cloth 1, the separation filter cloth 8, and the squeezing belt 10. Incidentally, the aforesaid cleaning may be performed for only one of the filter cloth 1, the separation filter cloth 8, and the squeezing belt 10.

The temperature of the cleaning liquid supplied here may be 10° C. to 75° C., and especially preferably, 10° C. to 50° C. is suitable. When the temperature of the cleaning liquid is, for example, 60 to 75° C., the inside of the hood 51A covering the solid-liquid separator 51 is filled with a large amount of steam. As a result, the humidity of an inlet portion 53A of a horizontal rotary dryer 53 communicating with the hood 51A via a drop chute 40, a conveying device 52, a feed chute 43, and a processing material feed path 41 becomes high, which involves a possibility of the adhesion of the processing material to the inlet portion 53A. In a case where a downflow path 140 is interposed, there is similarly a possibility of the adhesion of the processing material. There is also a possibility of an increase of the humidity of carrier gas G. Setting the temperature of the cleaning liquid to 10 to 50° C. makes it possible to avoid the adhesion of the processing material to the inlet portion of the horizontal rotary dryer and an excessive increase of the relative humidity of the carrier gas.

Besides, scrapers 22 may be provided in the running paths of the released filter cloth 1 and separation filter cloth 8 to scrape off the processing material adhering to the filter cloth 1 and the separation filter cloth 8.

Such a solid-liquid separator 51 is covered with the hood 51A and a discharge port 63 of the processing material is formed in the hood 51A. Exhaust ports 60 for discharging steam generated from the cleaning liquid can also be provided in the hood 51A. The exhaust ports 60 are connected to an exhaust blower 62 or the like via a duct 61 to exhaust the inside of the hood 51A.

When fine-powder slurry whose liquid content is, for example, about 90 wt % (W.B.) is subjected to the solid-liquid separation processing by the solid-liquid separator 51 according to the present invention, the deliquoring to about 15 wt % (W.B.) is possible.

Incidentally, even when a centrifugal separator, a filter press, or the like is combined with the horizontal vacuum filtering device 4, a drum-type vacuum filtering device, or a beltpress dehydrator, about 35 to 30 wt % (W.B.) is the lowest achievable liquid (water) content of the slurry having been deliquored (dehydrated).

(Conveying Device 52)

The processing material (deliquored material) deliquored (dehydrated) by the solid-liquid separator 51 is sent to the later-described horizontal rotary dryer 53. The conveying device 52 is used for the conveyance from the solid-liquid separator 51 to the horizontal rotary dryer 53. As the conveying device 52, a belt conveyor using a rubber belt is usable, for instance.

The belt conveyor 52 receives the deliquored material which is discharged from the solid-liquid separator 51 to drop through the drop chute 40, at a starting end side of the belt conveyor 52 and discharges the deliquored material from its terminal end side. The discharged deliquored material is led to the processing material feed path 41 (hereinafter, referred to as a "feed path 41") connected to the feed chute 43 and the feed port 53A.

In the mode in FIG. 1, in the middle of the feed chute 43, a (double) damper 42 having upper and lower double slide gates which open/close a flow path of the feed chute 43 is disposed. A rotary valve or the like is also usable instead of the damper 42.

Incidentally, the damper 42 can be connected without the feed chute 43 being provided between the belt conveyor 52 and the horizontal rotary dryer 53.

A blow port 43A of the carrier gas G is provided in the feed chute 43. In the mode in FIG. 1 in which the damper is provided, the blow port 43A is provided on a downstream side of the damper 42 and the carrier gas G flows in from the downstream side of the damper 42.

On the other hand, in the case where the damper 42 is connected without the feed chute 43 being provided between the belt conveyor 52 and the horizontal rotary dryer 53, the purging carrier gas G may flow into one of the damper 42 and the horizontal rotary dryer 53.

Incidentally, the blow port 43A may be provided in the horizontal rotary dryer 53 and the purging carrier gas G may flow directly into the horizontal rotary dryer 53.

The feed path 41 is composed of a vertical portion 41A connected to the feed chute 43 and an inclined portion 41B connected to the vertical portion 41A and having the feed port 53A. The feed path 41 is fixed to a fixing member E provided to seal one end side of a rotating shell 30.

A vibration generator 44 can be provided on the feed path 41 as required, and the adhesion of the deliquored material to the feed path 41 is prevented by vibration generated by the vibration generator 44. The vibration generator 44 is installed on the inclined portion 41B of the feed path 41, and its position is on a vertical portion 41A side in a longitudinal direction, preferably near a connection portion with the vertical portion 41A. When the vibration generator 44 is installed at such a position, a drop position of the processing material from the feed chute 43 substantially coincides with the installation position of the vibration generator 44. Accordingly, the deliquored material having dropped near a vibration generating source is supplied quickly to the dryer 53. As the vibration generator 44, any of known vibration generators 44 of an unbalanced mass type, an electrokinetic type, a hydraulic type, and so on can be adopted. When the vibration generator 44 is installed on the feed path 41, it is preferably fixed to the fixing member E via an elastic member such as a spring.

(Horizontal Rotary Dryer 53)

As the horizontal rotary dryer 53 according to the present invention, an indirect heating-type horizontal rotary dryer is usable, for instance.

The horizontal rotary dryer 53 has the feed port 53A of the deliquored material at its one end side and discharge ports 53B of a dried object at its other end side, and includes the rotating shell 30 rotatable around the axis and a heating unit 31 which heats the inside of the rotating shell 30.

The deliquored material supplied into the dryer 53 from the feed port 53A moves toward the other end side and is heated and dried by the heating unit 31 in a process of being discharged from the discharge ports 53B.

The heating unit 31 can be heating tubes extending along the axial direction of the rotating shell 30. The heating tubes 31 are composed of a plurality of metal pipes, which are attached so as to form concentric circles with respect to the axis of the rotating shell 30 or radially, in a circumferential direction and a radial direction.

Inside the heating tubes 31, steam or the like which are a heating medium flows to indirectly heat the processing material (deliquored material) moving in the rotating shell 30. It should be noted that supply and discharge directions of the heating medium are not limited.

The carrier gas G blown from the blow port 43A is discharged from an exhaust port 34 of a casing 33 together with moisture evaporating from the processing material. Incidentally, the carrier gas G can also function as cleaning gas of the processing material feed path 41 since it flows inside the processing material feed path 41.

As a flow direction of the carrier gas G, "cocurrent flow" that makes this flow direction the same as the flow direction of the processing material P is adopted.

At the other end side of the rotating shell 30, the casing 33 is provided which communicates with the discharge ports 53B formed in the rotating shell 30 and through which the carrier gas G in the rotating shell 30 is discharged to a flow path 54. In an upper portion of the casing 33, the exhaust port 34 of the carrier gas G is formed and the exhaust port 34 and the flow path 54 are connected. A discharge port 35 of the processing material P is also provided in a bottom surface of the casing 33.

Incidentally, it is desirable to provide a heating pipe 33A on an outer surface of the casing 33, make a heating medium S such as steam flow in the heating pipe 33A, and warm the carrier gas G in the casing 33 so as to prevent its dew condensation.

In short, in the present invention, since the carrier gas G flows in the same direction as the conveyance direction of the processing material (the cocurrent flow is adopted), the temperature of the carrier gas G at the outlet side is low. Here, by laying the steam pipe 33A on the exhaust hood 33 for the purpose of heat retention, it is possible to suppress the condensation of the vapor and discharge the vapor smoothly.

Incidentally, the steam pipe 33A can be disposed spirally on the outer surface of the casing 33, for instance.

Figure 7:
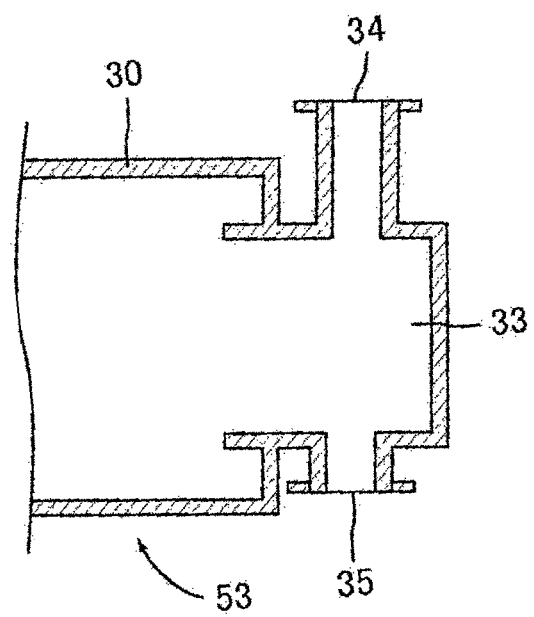
FIG. 7 is a cross-sectional view illustrating another example of a casing.
Figure 8:
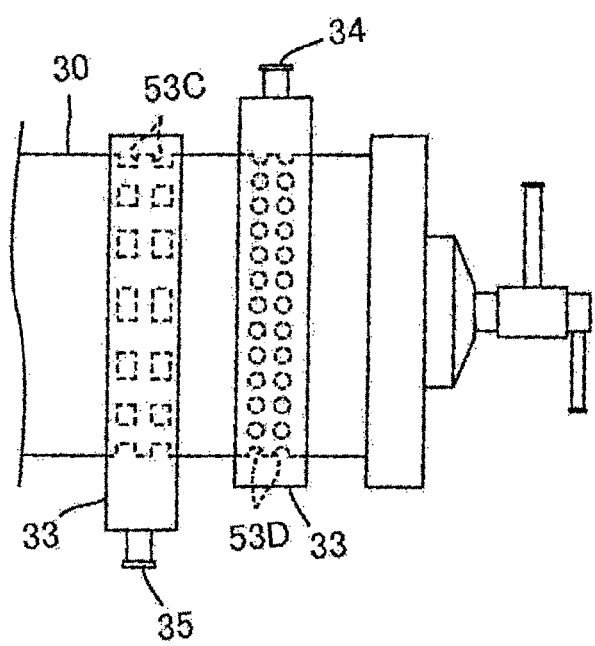
FIG. 8 is a side view illustrating another example of the casing.

In this embodiment, the casing 33 is structured so as to cover the rotating shell 30 but its shape is not limited to this, and also adoptable is a structure in which the casing 33 is fit in an end surface of the rotating shell 30 as illustrated in FIG. 7, the processing material P sent from a not-illustrated lifter blade provided in the casing 33 is discharged from the discharge port 35, and the carrier gas is discharged from the exhaust port 34. As illustrated in FIG. 8, in a case where carrier gas discharge ports 53D and processing material discharge ports 53C which are formed in the rotating shell 30 are provided at different positions in terms of the axial direction of the rotating shell 30, the casings 33 can be provided for the respective discharge ports 53C, 53D. In this case, the heating pipe 33A may be disposed at least on the casing 33 covering the carrier gas discharge ports 53D.

The casing 33 is fixed to the ground by a not-illustrated means so as not to rotate as the rotating shell 30 rotates.

The exhaust gas (carrier gas G) from the exhaust port 34 is supplied to a bag filter 55 through the flow path 54. The bag filter 55 collects the metal fine particles scattering with the carrier gas G to recover them as a dried product. Preferably, also in a range from the exhaust port 34 up to the flow path 54 and the bag filter 55, it is desirable to provide a heating pipe (not illustrated) as in the casing 33 to prevent the dew condensation of the exhaust gas.

(Downflow Path 140)

Figure 11:
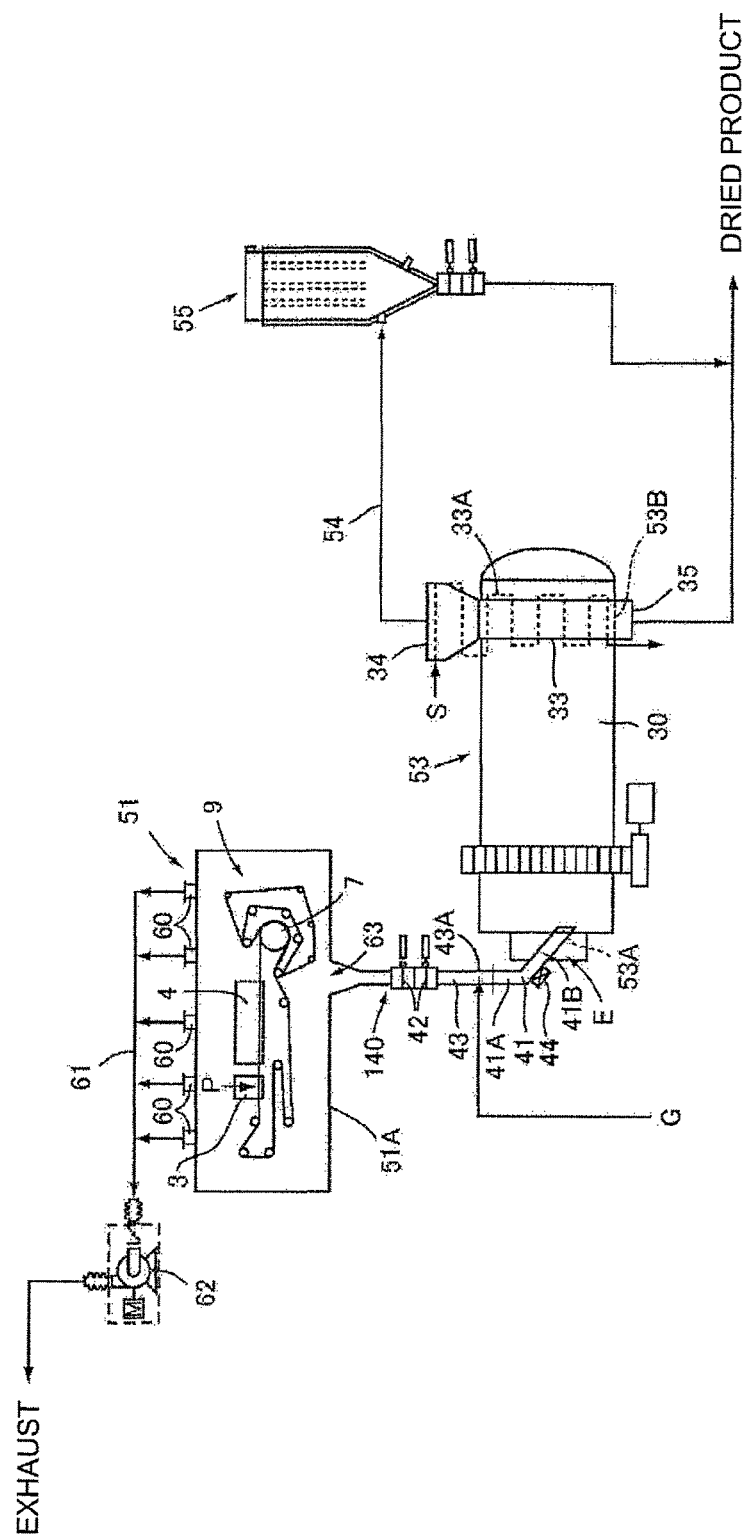
FIG. 11 is an overall view of system for solid-liquid separation and drying (with a damper) according to another example of the present invention.

FIG. 11 illustrates an overall view of system for solid-liquid separation and drying (with a damper) according to another example of the present invention. The processing material (deliquored material) deliquored (dehydrated) by the solid-liquid separator 51 is sent to the horizontal rotary dryer 53. The downflow path 140 including the feed chute 43 and the feed path 41 is used for the transfer from the solid-liquid separator 51 to the horizontal rotary dryer 53.

The deliquored material discharged from the solid-liquid separator 51 and falling down through the discharge port 63 of the hood 51A is led to the feed chute 43 connected to the processing material feed path 41 and the feed port 53A of the horizontal rotary dryer 53.

In the mode in FIG. 11, in the middle of the downflow path 140, a (double) damper 42 having at least upper and lower double slide gates which open/close the path is provided.

In the downflow path 140, the blow port 43A of the carrier gas G is provided. In the mode in FIG. 11 where the damper is provided, the blow port 43A is provided on the downstream side of the damper 42 and the carrier gas G flows in from the downstream side of the damper 42.

Incidentally, the blow port 43A may be provided in the horizontal rotary dryer 53 and the purging carrier gas G may directly flow into the horizontal rotary dryer 53.

In the mode in FIG. 11, the damper 42 is used as an airlock device which blocks and permits the communication between the inside of the hood 51A wrapping the solid-liquid separator 51 and the inside of the horizontal rotary dryer 53, but a not-illustrated rotary valve can be used on one stage or more.

Figure 12:
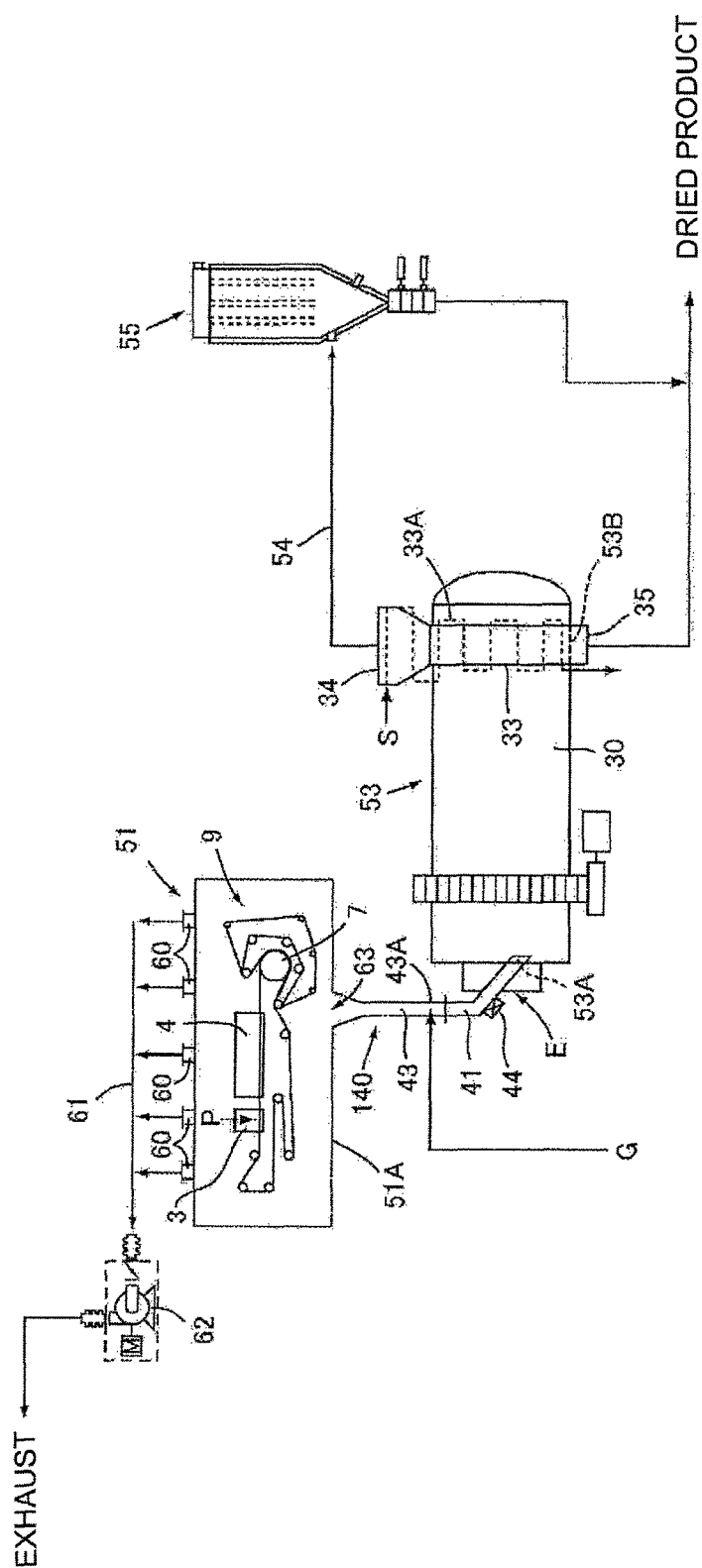
FIG. 12 is an overall view of system for solid-liquid separation and drying (without a damper) according to another example of the present invention.

Alternatively, without using the airlock device, it is suitable that the processing material can be transferred to the horizontal rotary dryer 53 only by the gravity of fall of the processing material, as illustrated in FIG. 12. This mode is effective especially when the temperature of the cleaning liquid is 10° C. to 50° C. This is because, if the cleaning liquid temperature is the aforesaid temperature, the possibility that the processing material adheres to the inlet portion 53A of the dryer 53 and the relative humidity of the carrier gas G excessively increases is low, even if the airlock device is not used.

Incidentally, the vibration generator 44 is preferably provided on the inclined portion 41B of the feed path 41. Specifically, the vibration generator 44 is preferably provided on the vertical portion 41A side in the longitudinal direction, preferably near the connection portion with the vertical portion 41A. When the vibration generator 44 is installed at such a position, the position to which the processing material drops from the feed chute 43 and the installation position of the vibration generator 44 substantially coincide with each other. Accordingly, the deliquored material having dropped near the vibration generating source is quickly supplied to the dryer 53.

EXAMPLES

Example 1

The present inventors performed the solid-liquid separation and drying of a nickel-cobalt-manganese compound by using the system in FIG. 1 in order to confirm the effects of the present invention.

The nickel-cobalt-manganese compound whose liquid content was 90 wt % (W.B.) was processed. A processing amount is 100 kg/h in terms of an amount in a dry state.

When the nickel-cobalt-manganese compound was processed by the solid-liquid separator 51 according to the present invention, it was possible to reduce the liquid content to 15 wt % (W.B.) at its discharge port.

When the processing material having undergone the solid-liquid separation (deliquored material) was sent to the dryer 53 by using a belt conveyor and dried by this dryer 53, it was possible to dry the processing material to 1 wt % (W.B.).

The temperature of the processing material which was 10° C. at the feed port 53A increased up to 120° C. at the discharge ports 53B as a result of the aforesaid drying. A supply amount of the carrier gas G is 35 kg/hr.

Then, when the dried product of the processing material was analyzed by using an ICP emission spectrochemical analysis method or a fluorescent X-ray analysis method, no mixture of an extraneous substance was observed and no contamination was observed. Nor was the deformation of the particles of the dried product observed.

Example 2 and Comparative Example 1

Figure 5:
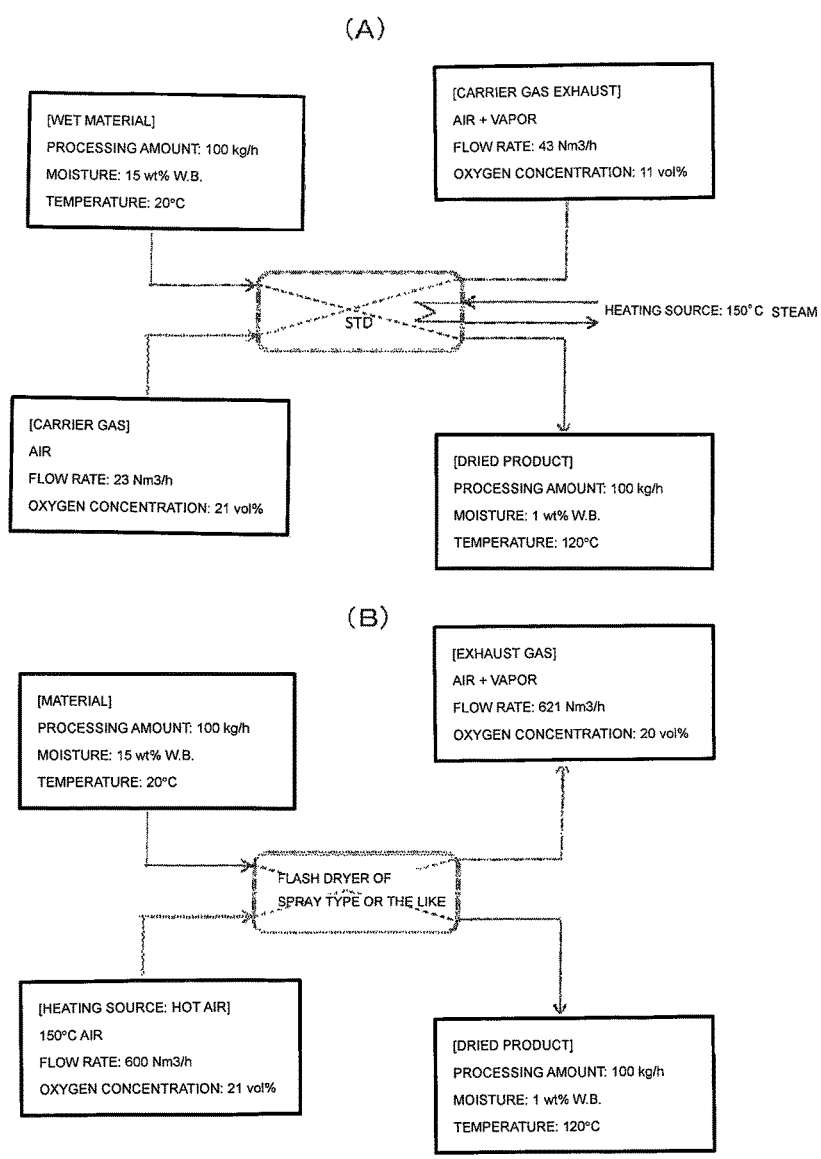
FIGS. 5 are explanatory charts of an example and a comparative example.
Figure 6:
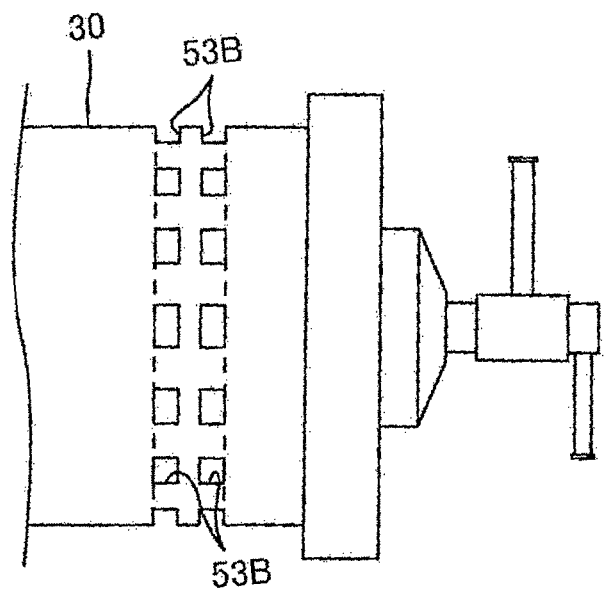
FIG. 6 is a side view illustrating a discharge port provided in a rotating shell.

As illustrated in FIGS. 5(A), (B), oxygen concentrations at an outlet side were studied when a steam tube dryer (hereinafter, referred to as "STD") which is an indirect heating-type horizontal rotary dryer was used for drying and when a flash dryer of a spray type or the like was used for drying. It was 20 vol % when the flash dryer was used and it was 11 vol % when the STD was used.

This indicates that, since an oxidation reaction of a dried product is suppressed when the STD is used, the STD is suitable for drying a material whose quality deterioration due to oxidization should be avoided.

Comparative Example 2

Further, in order to understand a phenomenon that moisture in exhaust gas condenses to form dew in a processed object when carrier gas is made to flow in the countercurrent manner, it was studied how much the moisture in the processing material having undergone drying processing increases, and then it was found out that the moisture which was 15 wt % (W.B.) in the case of the cocurrent flow increased to 18 wt % (W.B.) in the case of the countercurrent flow. It is understood from this that, when the flow of the carrier gas is cocurrent, it is possible to prevent an adhesion trouble and granulation of the processing material.

EXPLANATION OF NUMERALS AND SYMBOLS 1 filter cloth (separation filter cloth)
1A horizontal portion
2 roll
3 feed port
4 horizontal vacuum filtering device
7 separation roll
7A ventilation port
7B ventilation gas chamber
7C dispersing unit
8 separation filter cloth
9 solid-liquid separator
10 squeezing belt
20 separation filter cloth cleaning device
21 squeezing belt cleaning device 22 scraper
30 rotating shell
31 heating unit (heating tubes)
33 casing
33A heating pipe
34 exhaust port
35 discharge port
40 drop chute
41 processing material feed path (feed path)
41A vertical portion
41B inclined portion
42 damper
43 feed chute
43A blow port
44 vibrator
51 solid-liquid separator
51A hood
52 conveying device (belt conveyor)
52A belt
52B discharge port (of belt conveyor)
52C feed port (of belt conveyor)
53 horizontal rotary dryer
53A feed port
53B discharge port
53C processing material discharge port
53D carrier gas discharge port
54 flow path
55 bag filter
56 double bumper
60 exhaust port
61 duct
62 exhaust blower
63 discharge port (of solid-liquid separator)
140 downflow path
E fixing member
G carrier gas
P processing material
S heating medium
g ventilation gas

The invention claimed is:

1. A system for solid-liquid separation and drying of fine-powder slurry, comprising:
a solid-liquid separator including a structure
in which a pair of endless separation filter cloths is wound in a stacked state around an outer periphery of a separation roll rotated in a circumferential direction and is capable of running along the rotation direction of the separation roll, and
in which a processing material supplied between the pair of separation filter cloths is deliquored by being sandwiched and squeezed between the pair of separation filter cloths on an outer peripheral surface of the separation roll and also by ventilation gas passing from an inside toward an outside of the separation roll through a ventilation port formed in the outer peripheral surface of the separation roll; and
a horizontal rotary dryer which is installed on a subsequent stage of the solid-liquid separator, has a feed port of the processing material at one end side and a discharge port of the processing material at another end side, includes: a rotating shell rotatable around an axial direction; and a heating unit provided inside the rotating shell and having heating tubes having a heating medium flow therethrough, and heats and dries the processing material by the heating unit in a process where the processing material supplied from the feed port of the rotating shell is discharged from the discharge port,
wherein carrier gas is made to flow in the rotating shell in a cocurrent manner in the same direction as a conveyance direction of the processing material, a bag filter is provided in a discharge flow path of the carrier gas of the horizontal rotary dryer, an exhaust hood, which is connected to the bag filter and an end portion on the other end side, discharges exhaust gas, and the exhaust hood includes a heating pipe.

2. The system for solid-liquid separation and drying of fine-powder slurry according to claim 1, wherein a belt conveyor is provided between the solid-liquid separator and the feed port of the horizontal rotary dryer.

3. The system for solid-liquid separation and drying of fine-powder slurry according to claim 2, wherein a damper is provided between a discharge port of the belt conveyor and the feed port of the horizontal rotary dryer, and the carrier gas is made to flow in from a side closer to the horizontal rotary dryer than the damper.

4. The system for solid-liquid separation and drying of fine-powder slurry according to claim 1, comprising a downflow path which leads the processing material discharged from the solid-liquid separator of the fine-powder slurry to the feed port of the horizontal rotary dryer by gravity of fall without using a mechanical conveying means.

5. The system for solid-liquid separation and drying of fine-powder slurry according to claim 4, wherein the downflow path leads the processing material to the feed port of the horizontal rotary dryer only by the gravity of fall.

6. The system for solid-liquid separation and drying of fine-powder slurry according to claim 4, wherein an airlock device which blocks and permits the communication between an inside of a hood wrapping the solid-liquid separator and an inside of the horizontal rotary dryer is provided in the downflow path.

7. The system for solid-liquid separation and drying of fine-powder slurry according to claim 6, wherein the airlock device is a plurality of dampers provided in a dropping direction of the processing material.

8. The system for solid-liquid separation and drying of fine-powder slurry according to claim 6, wherein the airlock device is a rotary valve provided in a dropping direction of the processing material.

9. The system for solid-liquid separation and drying of fine-powder slurry according to claim 6, wherein a vibration generator is provided on the downflow path.

10. A solid-liquid separation and drying method of fine-powder slurry, the method comprising:
separating a processing material by a solid-liquid separator including a structure in which a pair of endless separation filter cloths is wound in a stacked state around an outer periphery of a separation roll rotated in a circumferential direction and is capable of running along the rotation direction of the separation roll, and a processing material supplied between the pair of separation filter cloths is deliquored by being sandwiched and squeezed between the pair of separation filter cloths on an outer peripheral surface of the separation roll and also by ventilation gas passing from a ventilation port formed in the outer peripheral surface of the separation roll; and
drying the processing material having undergone the solid-liquid separation, by a horizontal rotary dryer which has a feed port of the processing material at one end side and a discharge port of the processing material at another end side, includes: a rotating shell rotatable around an axial direction; and a heating unit provided inside the rotating shell and having heating tubes having a heating medium flow therethrough, and heats and dries the processing material by the heating unit in a process where the processing material supplied from the feed port of the rotating shell is discharged from the discharge port, wherein carrier gas is made to flow in the rotating shell in a cocurrent manner in the same direction as a conveyance direction of the processing material, a bag filter is provided in a discharge flow path of the carrier gas of the horizontal rotary dryer, an exhaust hood, which is connected to the bag filter and an end portion on the other end side, discharges exhaust gas, and the exhaust hood includes a heating pipe.

11. The solid-liquid separation and drying method of fine-powder slurry according to claim 10, wherein the processing material discharged from the solid-liquid separator of the fine-powder slurry is led to the feed port of the horizontal rotary dryer by gravity of fall through a downflow path without using a mechanical conveying means.

12. The solid-liquid separation and drying method of fine-powder slurry according to claim 10, wherein the processing material contains fine particles with a 100 µm particle size or less.

13. The solid-liquid separation and drying method of fine-powder slurry according to claim 10, wherein the solid-liquid separator includes a cleaning device, and after the processing material having undergone the solid-liquid separation is discharged, a cleaning liquid at a 10° C. to 50° C. temperature is sprayed to the processing material adhering to the separation filter cloth.

* * * * *